United States Patent
Sedlacek (10) Patent No.: US 11,705,701 B2
(45) Date of Patent: Jul. 18, 2023

(54) CABLE-JACKET REMOVAL TOOL

(71) Applicant: Anthony Sedlacek, Randolph, KS (US)

(72) Inventor: Anthony Sedlacek, Randolph, KS (US)

( * ) Notice: Subject to any disclaimer, the term of this patent is extended or adjusted under 35 U.S.C. 154(b) by 0 days.

(21) Appl. No.: 17/649,722

(22) Filed: Feb. 2, 2022

(65) Prior Publication Data

US 2022/0158423 A1    May 19, 2022

Related U.S. Application Data (63) Continuation of application No. 16/446,113, filed on Jun. 19, 2019, now Pat. No. 11,276,993.

(60) Provisional application No. 62/687,312, filed on Jun. 20, 2018.

(51) Int. Cl.
*H02G 1/12* (2006.01)
*G02B 6/245* (2006.01)

(52) U.S. Cl.
CPC ........... *H02G 1/1265* (2013.01); *H02G 1/127* (2013.01); *G02B 6/245* (2013.01)

(58) Field of Classification Search
CPC .. H02G 1/1265; H02G 1/1224; H02G 1/1297; H02G 1/1221; G02B 6/245; B25B 45/14; B23B 45/14
USPC ................................. 30/90.3, 91.2, 122, 500
See application file for complete search history.

(56) References Cited

U.S. PATENT DOCUMENTS

| | | | |
|---|---|---|---|
| 2,982,320 A | 5/1961 | Trumbull et al. | |
| 2,989,806 A | 6/1961 | Davis | |
| 3,959,877 A | 6/1976 | Zorzenon | |
| 3,990,331 A * | 11/1976 | Matthews | H02G 1/1265 30/90.1 |
| 4,317,279 A | 3/1982 | Smith et al. | |
| 4,345,375 A | 8/1982 | Hayward | |
| 5,457,877 A | 10/1995 | McDermott | |
| 6,161,289 A | 12/2000 | Alexander | |
| 6,381,850 B1 * | 5/2002 | Warner | H02G 1/1229 30/90.6 |
| 6,513,244 B1 * | 2/2003 | Andreescu | H02G 1/1226 30/90.1 |
| 6,668,458 B1 | 12/2003 | Schoenleber | |
| 7,984,553 B1 | 7/2011 | Miller et al. | |

(Continued)

FOREIGN PATENT DOCUMENTS

KR    101847404 B1    4/2018

OTHER PUBLICATIONS

Ripley, Utility Tool WS 5 Series 600V-35kV Cable End Stripper, website, https://www.ripley-tools.com/utilitytool/ws5.

*Primary Examiner* — Laura M Lee
(74) *Attorney, Agent, or Firm* — Avek IP, LLC; Kent R. Erickson (57) ABSTRACT

A cable-jacket removal tool is described. The tool includes cutting unit that provides a cutting cylinder that carries a blade and a die. The blade is adjustable to provide a desired depth of cut into the cable jacket. The die is interchangeable and selectable based on a diameter or gage of cable to be stripped. A drive unit that is adapted to be driven by a common, handheld, battery operated drill is also provided. The drive unit rotates the cutting cylinder and the blade carried thereby about the circumference of the cable. The drill is coupled to the drive unit such that the axis of rotation of the drill and the cutting cylinder are substantially parallel and an operator can easily apply a force on the tool via the drill in a direction substantially parallel to those axes of rotation.

17 Claims, 7 Drawing Sheets

(56) References Cited

U.S. PATENT DOCUMENTS

| | | | |
|---|---|---|---|
| 8,075,229 B2* | 12/2011 | Mok | B23B 31/123 |
| | | | 408/124 |
| 9,391,435 B2 | 7/2016 | Woodward | |
| 9,701,032 B2 | 7/2017 | Moss et al. | |
| 9,934,889 B2 | 4/2018 | Kehl et al. | |
| 2004/0221456 A1 | 11/2004 | Losinger | |
| 2013/0055571 A1 | 3/2013 | Nugent | |
| 2016/0271781 A1 | 9/2016 | Kobayashi et al. | |
| 2018/0152009 A1 | 5/2018 | Manser et al. | |
| 2020/0313406 A1 | 10/2020 | Manser et al. | |

* cited by examiner

CABLE-JACKET REMOVAL TOOL

CROSS-REFERENCE TO RELATED APPLICATIONS

This application is a continuation of U.S. patent application Ser. No. 16/446,113, filed Jun. 19, 2019 which claims the benefit of U.S. Provisional Patent Application No. 62/687,312, filed Jun. 20, 2018, the disclosures of which are hereby incorporated herein in their entirety by reference.

BACKGROUND

Tools to remove the outer insulating jacket of wires and cables vary in their design and function usually based on the gauge of wire/cable to be stripped. Smaller gauge wires can often be stripped using handheld tools similar to pliers which first cut the outer jacket and then allow that portion of the jacket to be removed by pulling or sliding off the wire. These simple handheld jacket removal tools are not large enough to accommodate larger gauge cables such as those commonly used as primary underground electrical cables.

Wire strippers for larger gauge wires on the market today are designed for end stripping of wires to a preset length within the tool—typically one to three inches in length. During installation of new electrical services, it is often required to strip up to three feet of the outer jacket from the wire. Today this is manually accomplished by pulling a single strand of wire out of the larger bundle of wires in a cable. The exposed end of the strand is pulled away from the bundle and along the length of the cable using a hand tool, such as a pair of pliers. The strand itself may cut through the jacket as it is pulled away from the bundle or pulling the strand away from the bundle may provide a space between the bundle and the jacket in which to insert a cutting tool, such as a pair of pliers, nippers, dykes, or the like to cut the jacket. This process is difficult and may cause tremendous strain on the operators as well as potential safety concerns.

Worker fatigue and safety are two major concerns in any industry and the utility industry is no different. For safety purposes, most utility companies no longer allow employees to use a knife for any purpose on the job due to the number of associated injuries. As a result, in order to remove outer insulating jackets from heavy gauge wires or cables installers are left with very few options.

As described above, most available tools configured to remove the jacket from large gauge cables are only capable of removing a small section of the jacket at the end of the cable. One such known tool is the WS 5 Series UTILITY-TOOL provided by Ripley Tools, LLC of Cromwell, Conn. The WS 5 Series tools comprise a cylindrical tube that is installed on an end of a cable to be stripped and may be operated manually by rotating the cylinder about a longitudinal axis of the cable by hand or with the aid of a wrench-style tool. An adaptor may be provided to enable use of a common handheld drill to rotate the tool. The cable is inserted into one end of the tool coaxial with the cylinder and the drill is coupled to an opposite end of the tool and coaxial with the cylinder and the cable. As such, the WS 5 Series tools are limited to stripping or removing the jacket from cable by the depth of the cylinder; the WS 5 Series tools are advertised as being limited to stripping only about 5.75 inches of cable length.

U.S. Pat. No. 9,391,435 to Woodward, U.S. Patent Application Publication No. 2013/0055571 to Nugent, and U.S. Pat. No. 6,668,458 to Schoenleber each describe devices similar to the WS 5 Series tool.

Korean Pat. No. 101847404 describes another stripper for insulated wire. The stripper includes a peeling unit and a drill member. The peeling unit includes a wheel with a toothed circumference that is disposed on a cable to be stripped with the cable extending through a central aperture in the wheel. A stripping or peeling knife is coupled to the wheel to be rotated about the circumference of the cable by rotation of the wheel. A worm gear is aligned transverse to the length of the cable and is meshed with the teeth of the wheel. The drill member is disposed transverse to the length of the cable and is adapted to rotate the worm gear. The wheel is thereby rotated to cause the knife to cut the insulation jacket from the cable.

A tool that enables cutting or stripping of an outer jacket of large gage wires and cables without undue strain on the operator is needed. A tool that can provide such stripping along any length of wire or cable in a single operation is also needed.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes a cable-jacket removal tool for removing a protective jacket from a desired length of wire or cable for preparing the wire/cable termination.

The jacket removal tool includes a cutting unit and a drive unit. The cutting unit includes a cutting cylinder with a blade housing coupled along a leading end thereof. The cutting cylinder provides a central bore through which a cable is insertable. A recess or cutout is formed in the leading end of the cutting cylinder positioned within the blade housing to enable a blade mounted on the blade housing to extend into the central bore and into engagement with a cable disposed therein. The leading end of the cutting cylinder is further adapted to removably receive a die. A plurality of dies having selected interior dimensions configured to adapt the tool to a particular diameter cable may be provided and interchangeably coupled within the leading end of the cutting cylinder.

The drive unit includes a housing through which the cutting cylinder extends. A drive axle protrudes from the housing at a location spaced transversely apart from and parallel to the cutting cylinder. The cutting cylinder and the drive axle are operably coupled to a gear train within the housing. The drive axle is configured for coupling with a common hand-held drill or similar drive means such that the drill may be employed to power rotation of the drive axle and thereby rotation of the cutting cylinder relative to the housing.

In operation, an appropriate die is selected and installed in the leading end of the cutting cylinder based on the size of cable or wire to be stripped. An end of the cable or wire is inserted through the die, into the leading end of the bore in the cutting cylinder and moved toward a terminal end of the cutting cylinder into engagement with the blade. The position of the blade radially within the bore in the cutting cylinder may be adjusted to provide a desired depth of cut into the cable or wire. A drill or similar drive means is coupled with the drive axle and is operated to provide rotation of the cutting cylinder and thus the blade carried thereby about the cable. The blade engages and cuts into the jacket on the cable as the blade moves about the circumference of the cable. A force may be provided by an operator in the longitudinal direction to aid movement of the tool along the length of the cable or wire. The cut portion of the jacket exits the cutting cylinder and the blade housing via a blade window in the cutting cylinder and an opening in the blade housing which may be formed to redirect the cut portion away from the cable or wire and the operator. The operator may continue the operation until the jacket has been removed from a desired length of the cable or wire without limitation to any particular length. The tool may then be removed from engagement with the cable by moving or sliding in the opposite longitudinal direction along the cable.

DESCRIPTION OF THE DRAWINGS

Illustrative embodiments are described in detail below with reference to the attached drawing figures, and wherein.

DETAILED DESCRIPTION

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

Figure 6:
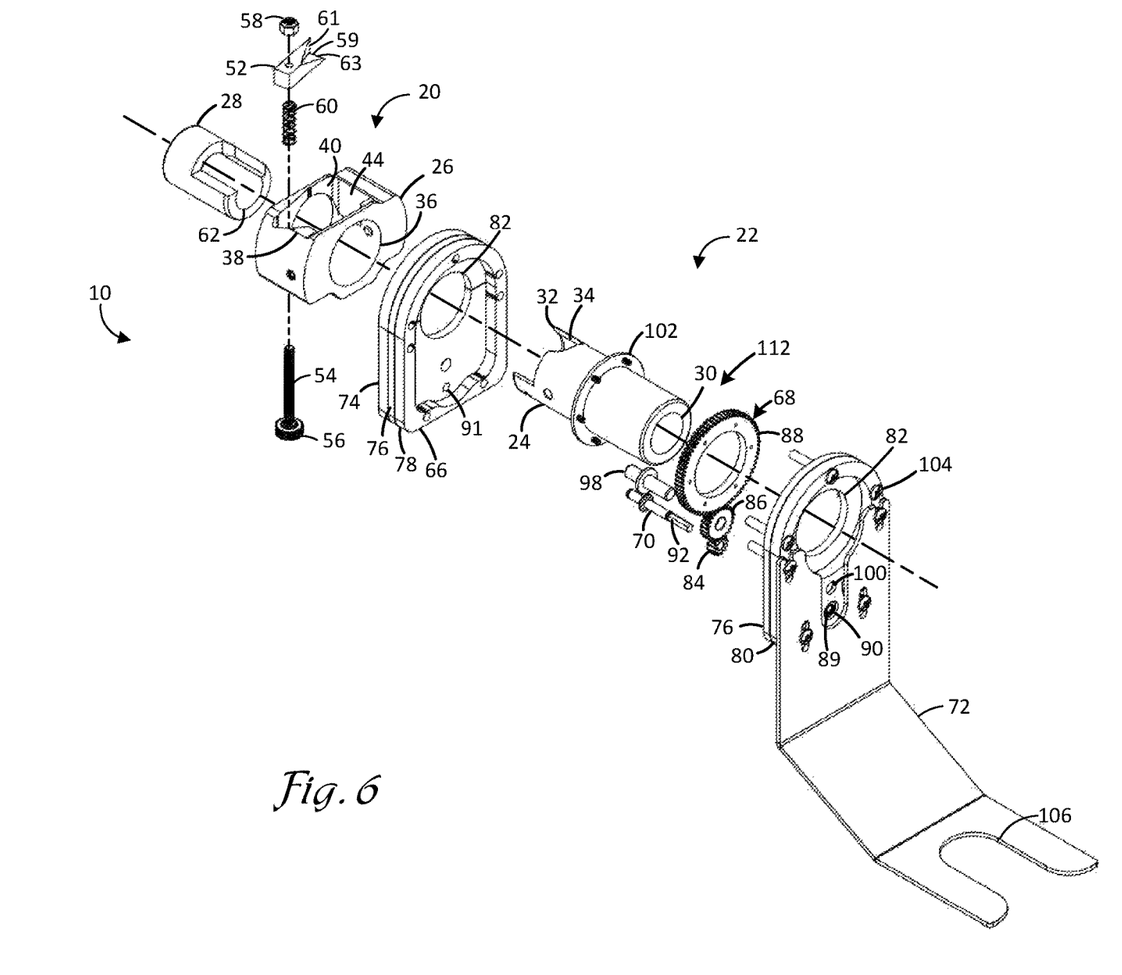
FIG. 6 is a perspective, exploded view of the cable-jacket removal tool of FIG. 1.
Figure 7:
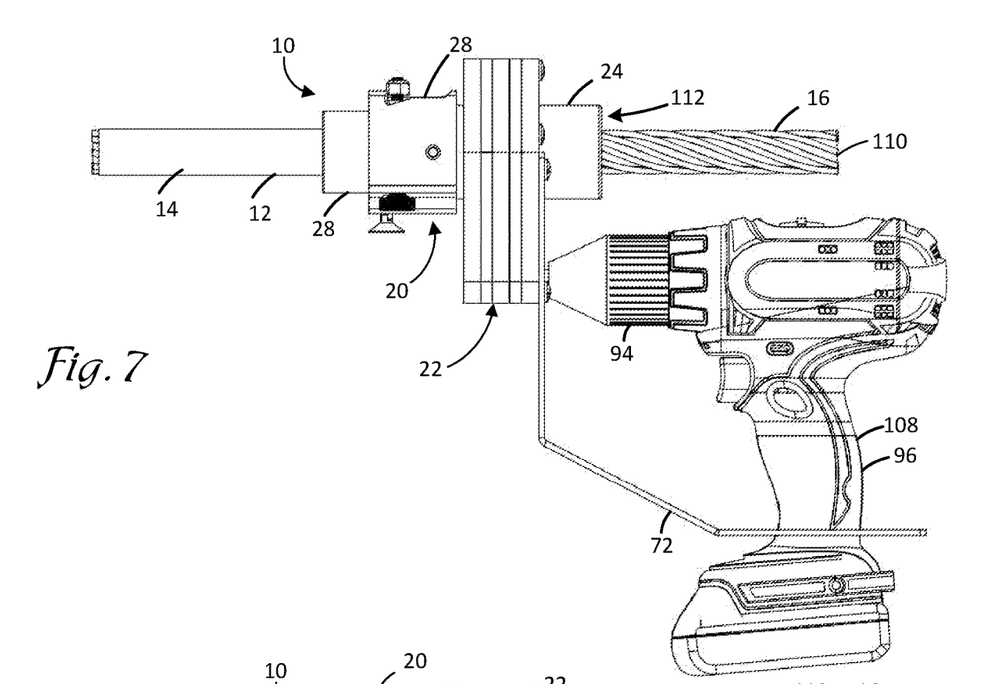
FIG. 7 is a side elevational view of the cable-jacket removal tool of FIG. 1 depicted installed on a cable and with a handheld driver coupled thereto in accordance with an exemplary embodiment.
Figure 8:
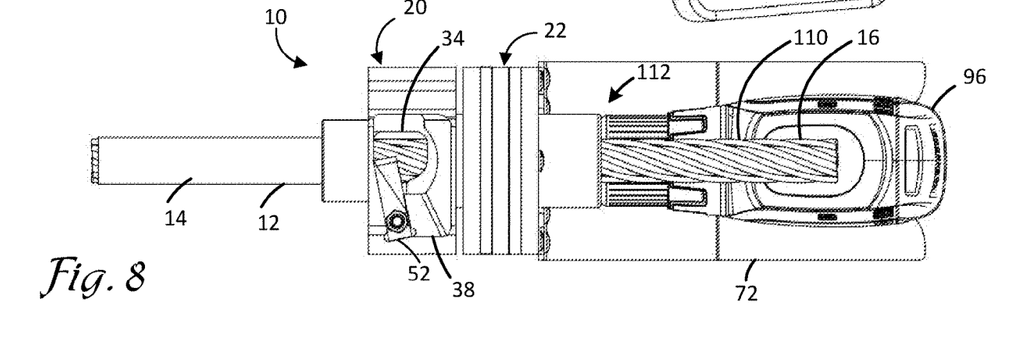
FIG. 8 is a top plan view of the cable-jacket removal tool, cable, and driver of FIG. 7.
Figure 9:
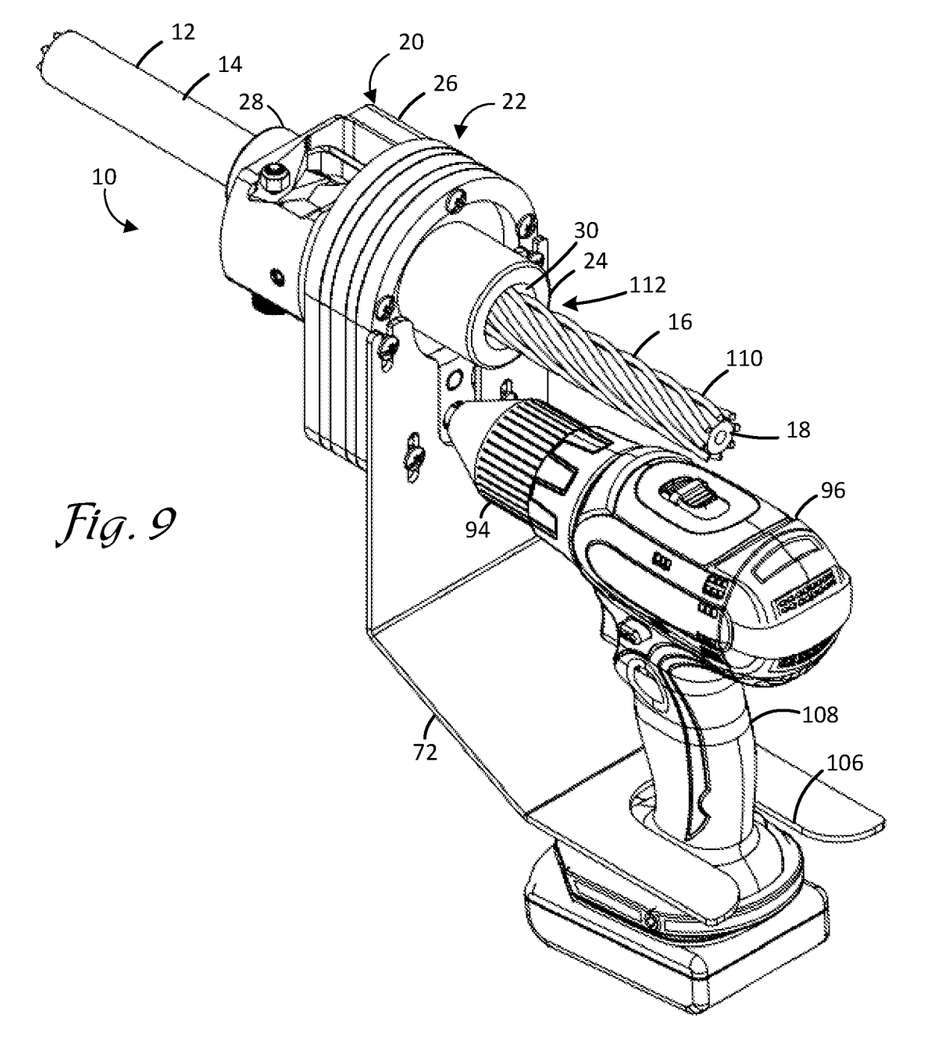
FIG. 9 is a perspective view of the cable-jacket removal tool, cable, and driver of FIG. 7.

With reference to FIGS. 1-9, a cable-jacket removal tool 10 is described in accordance with an exemplary embodiment. The cable-jacket removal tool 10 is configured to remove an outer jacket 12 or insulating layer from a cable 14. The tool 10 is described herein with respect to use with a cable 14, however such is not intended to limit application of the tool 10 to any particular cable, wire, or similar component. For example, as known in the art, cables 14 generally comprise a plurality of leads, wires, or conductors 16 as well as insulating members 18, among other components disposed in a variety of arrangements within an outer, protective jacket 12. One example of which is depicted in FIGS. 7-9. Wires are generally understood as comprising a single conductor or a plurality of braided conductors within a protective, outer jacket. Conductors within cables and wires may comprise conductors for electrical, optical, or other transmissions, such as metallic strands, fiber strands, fiber optic strands, among a variety of others. All such configurations are referred to generally herein as cables 14.

The cable-jacket removal tool 10 comprises a cutting unit 20 and a drive unit 22. The cutting unit 20 is operably coupled with the drive unit 22 to be rotated by the drive unit 22 about the cable 14 inserted through the cutting unit 20. The cutting unit 20 comprises an elongate cutting cylinder 24, a blade housing 26, and a die 28.

The cutting cylinder 24 extends in a longitudinal direction and provides an axial central bore 30. The central bore 30 is provided with a radial dimension sufficient to receive the cable 14 therethrough and is preferably sized to receive a predetermined maximum size cable 14. At least a leading portion of the central bore 30 extending inward from a leading end 32 of the cutting cylinder 24 is dimensioned to receive the die 28 therein. In one embodiment, the leading portion of the central bore 30 has a greater radial dimension than the remainder of the central bore 30 to provide clearance for insertion of the die 28 and may provide a shoulder 33 against which the die 28 may be abutted. A portion of a wall of the leading end 32 of the cutting cylinder 24 is removed to form a blade window 34 that is substantially positioned within the blade housing 26 as described more fully below.

The blade housing 26 is affixed to the cutting cylinder 24 at or near the leading end 32. The blade housing 26 includes a housing bore 36 sized to receive the leading end 32 of the cutting cylinder 24 and provides an opening 38 that is aligned with the blade window 34 in the cutting cylinder 24.

Figure 1:
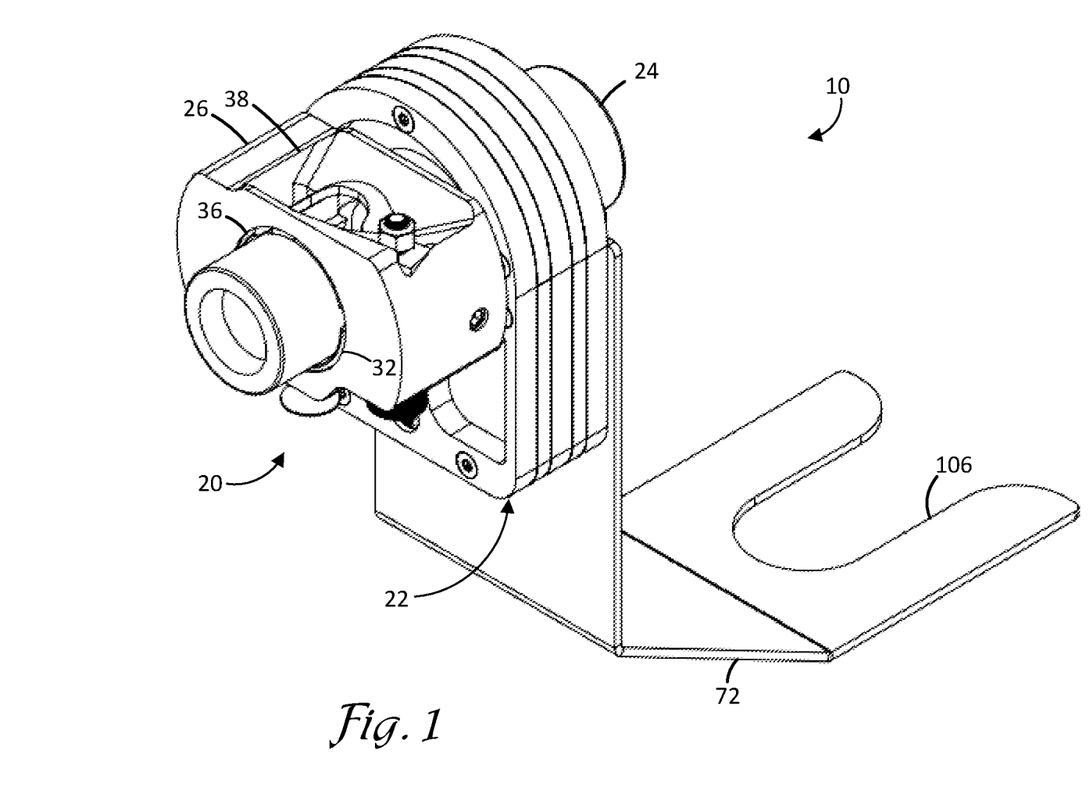
FIG. 1 is a top perspective view of a cable-jacket removal tool depicted in accordance with an exemplary embodiment.
Figure 2:
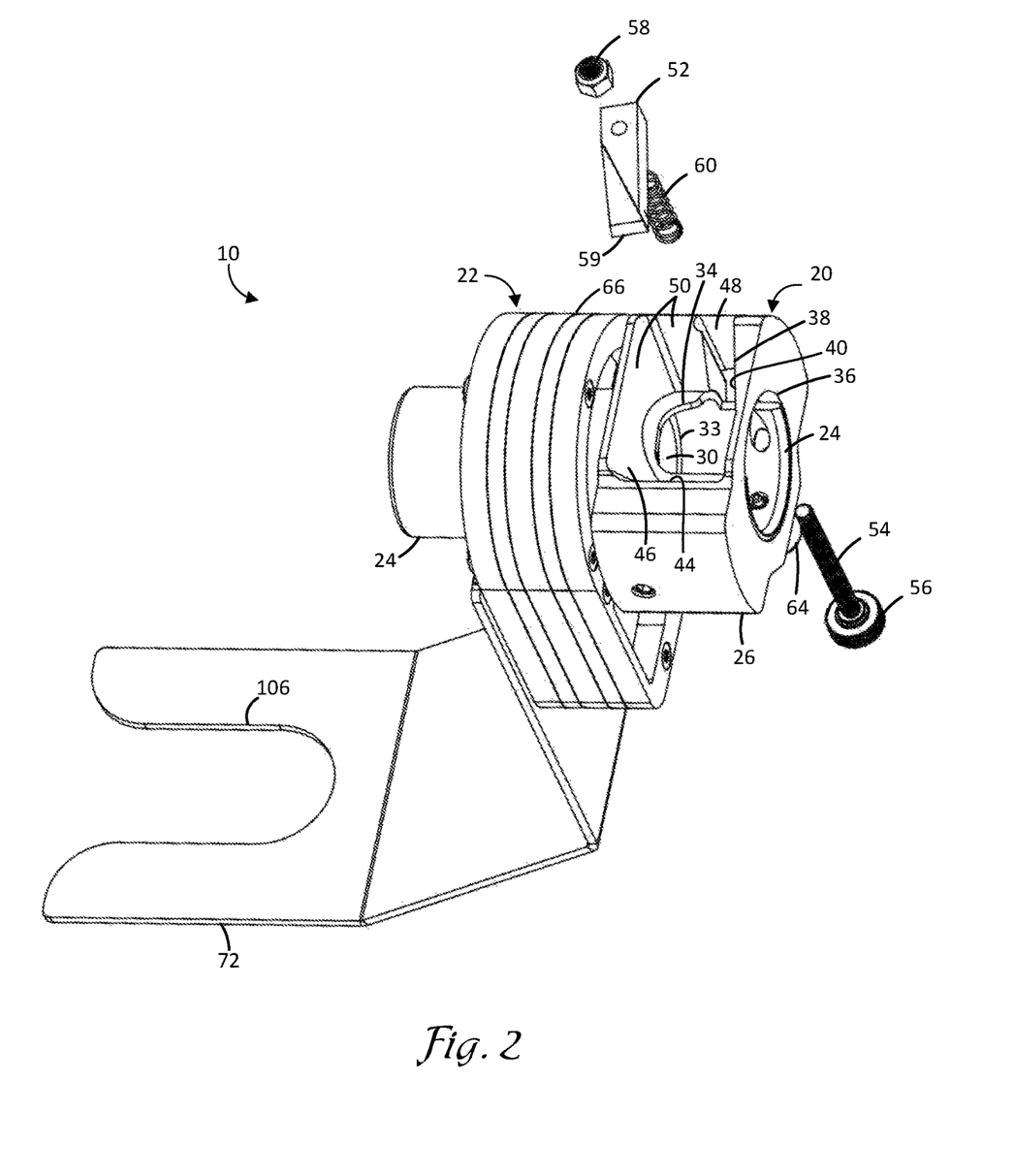
FIG. 2 is a partially exploded top perspective view of the cable-jacket removal tool of FIG. 1.
Figure 3:
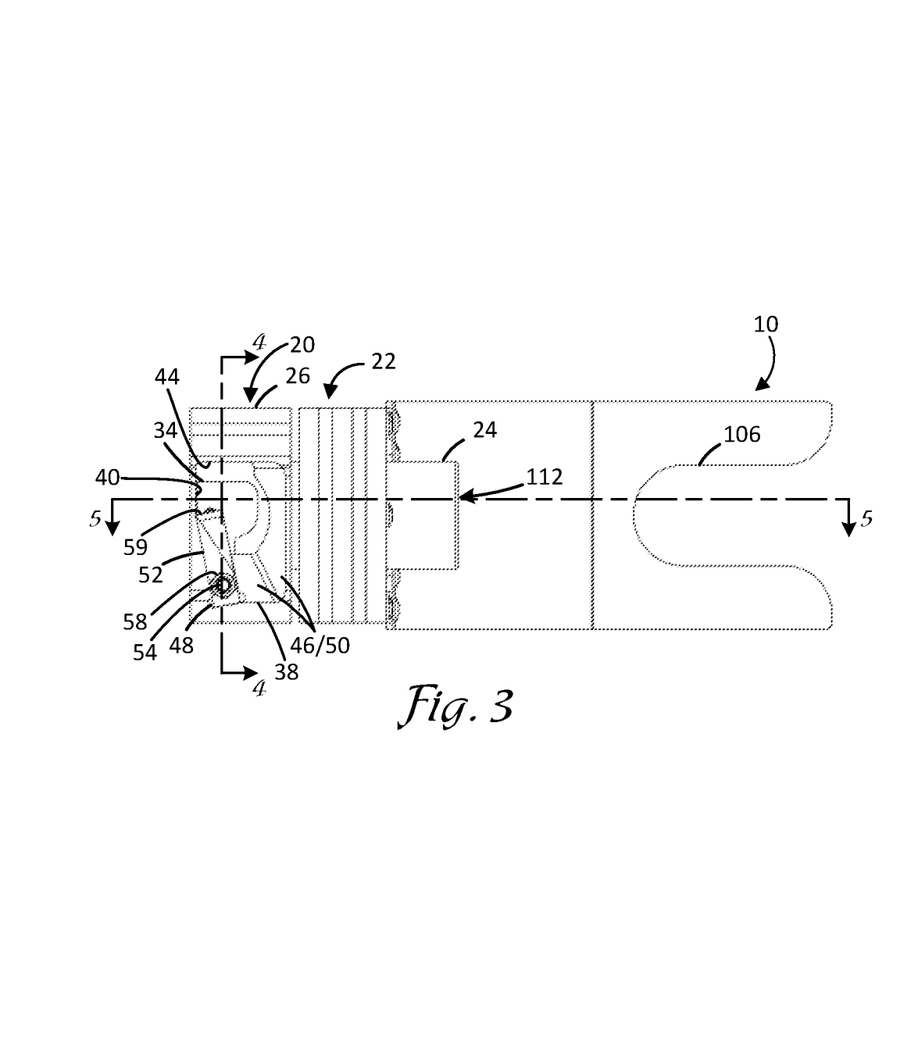
FIG. 3 is a top plan view of the cable-jacket removal tool of FIG. 1.
Figure 4:
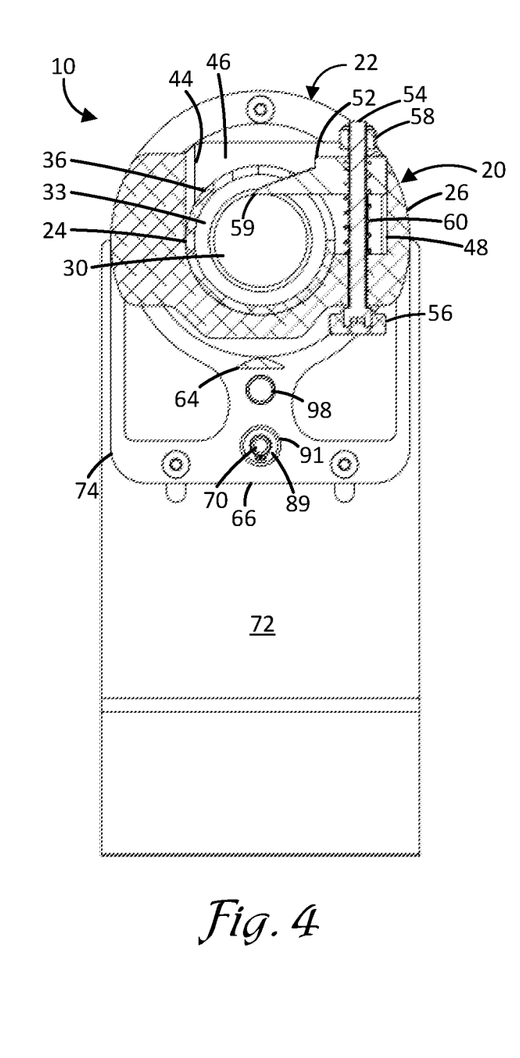
FIG. 4 is a cross-sectional front-end elevational view of the cable-jacket removal tool taken along the line 4-4 depicted in FIG. 3.
Figure 5:
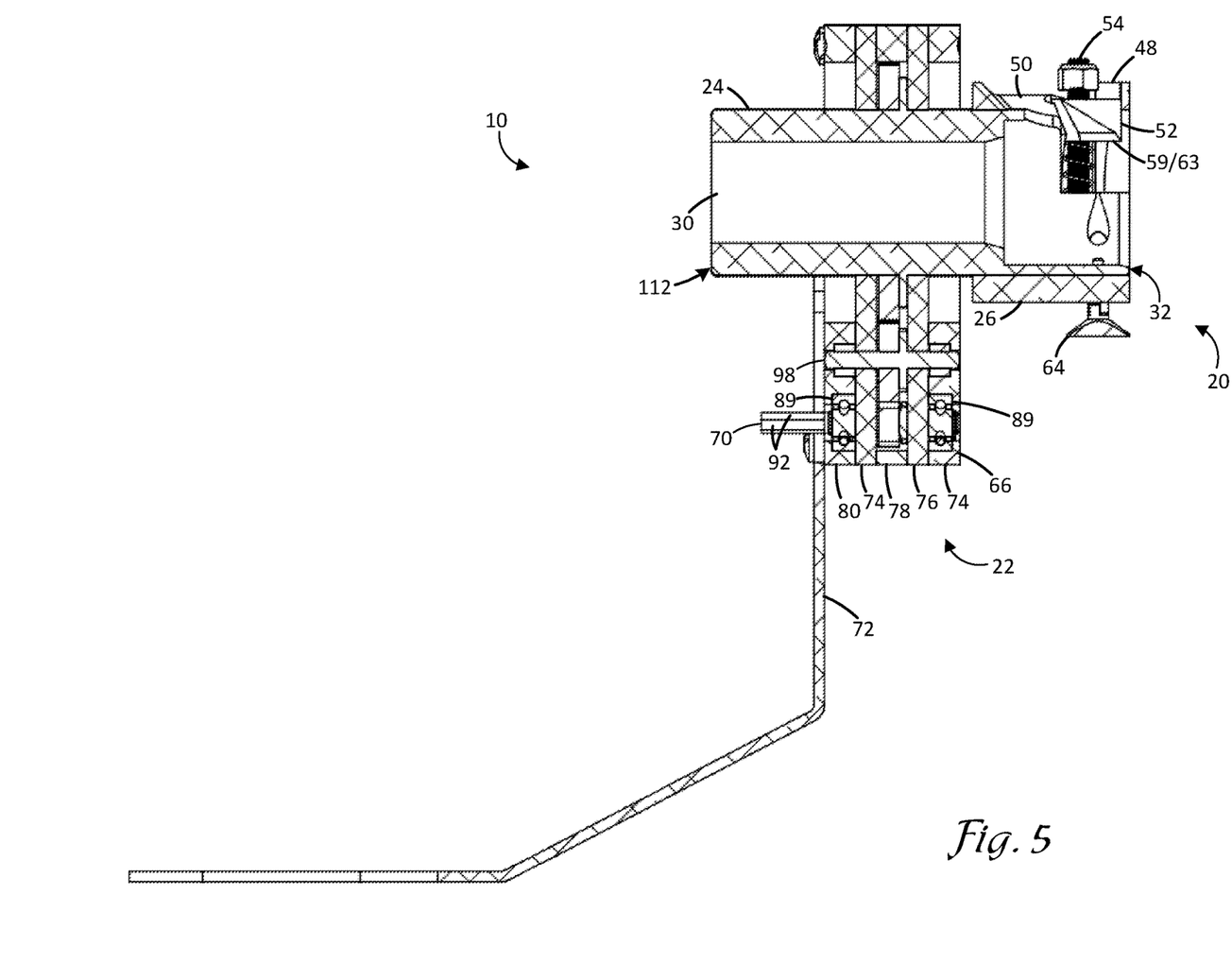
FIG. 5 is a cross-sectional side elevational view of the cable-jacket removal tool taken along the line 5-5 depicted in FIG. 3.

The opening 38 is defined by a forward wall 40, a sidewall 44, and a base wall 46. The base wall 46 includes a blade channel 48 and one or more ejector surfaces or guide surfaces 50. A blade 52 is disposed in the blade channel 48 and extends at least partially through the blade window 34 in the cutting cylinder 24 and into the central bore 30 where the blade 52 can contact the cable 14 disposed therein. The blade 52 is retained in the blade channel 48 via a fastener 54, such as a thumbscrew, disposed to extend through the blade 52 and through the blade housing 26 to exit from an opposite side of the blade housing 26. A first end of the fastener 54, opposite the blade 52, may be configured to provide a manually grip-able head 56, to allow manual rotation thereof or to be rotatable by a common or specialized hand tool, such as a screwdriver or wrench. An opposite second end of the fastener 54 is coupled with a nut 58 or similar component to retain the blade 52 along the length of the fastener 54. In another embodiment, the blade 52 may include a threaded bore which may provide direct threadable coupling with the fastener 54. As depicted in FIGS. 4 and 6, a coil spring 60 is disposed on the fastener 54 between the blade 52 and the blade housing 26 to bias the blade 52 against the nut 58, away from the blade housing 26, and outward from the blade channel 48.

The position of the blade 52 within the blade channel 48 and thus its position in the central bore 30 is adjustable via rotation of the fastener 54. In one embodiment, the fastener 54 is threadably coupled with the blade housing 26 such that rotation of the fastener 54 extends or retracts the extension of the fastener 54 relative to the blade channel 48 and thus the position of the blade 52 within the blade channel 48. In another embodiment, the fastener 54 is not threadably coupled to the blade housing 26 but is threadably coupled to the blade 52. As such, rotation of the fastener 54 moves the blade 52 along the length of the fastener 54 to thereby alter the position of the blade 52 in the blade channel 48. Alternatively, the fastener 54 may threadably couple to the nut 58 and the nut 58 may be retained against rotation relative to the blade 52 such that rotation of the fastener 54 moves the nut 58 and thus the blade 52 along the length of the fastener 54. In any of these configurations the spring 60 biases the blade 52 toward the second end of the fastener 54 and away from or out of the blade channel 48.

The blade 52 comprises a generally rectangular cuboidal form with a wedge removed from an end thereof to form a generally L-shaped cutting edge 59. An upstanding portion 61 of the cutting edge 59 cuts the jacket 12 along a radius of the cable 14 while a base portion 63 of the cutting edge 59 may provide a longitudinally aligned cut. Preferably the base portion 63 is positioned relative to the cable 14 by adjustment of the fastener 54 to engage between the jacket 12 and the underlying components of the cable 14 to lift or direct the cut jacket 12 radially outward and away from the cable 14. The ejector surfaces 50 of the base wall 46 of the opening 38 may be further positioned or angled radially outward to aid lifting of the cut jacket 12 radially outward and away from the cable 14. The ejector surfaces 50, as well as the forward wall 40 and sidewall 44 also preferably direct the cut jacket 12 away from an operator of the tool 10 so as to avoid entanglement and to ease operation of the tool 10.

The die 28 comprises a hollow cylinder having a cable-specific bore 62 extending longitudinally therethrough. A portion of a wall of the die 28 is removed so as not to substantially obstruct the opening 38 in the blade housing 26 or the blade window 34 in the cutting cylinder 24 when the die 28 is installed in the leading end 32 of the cutting cylinder 24. The cable-specific bore 62 is preferably sized, i.e. has a diametrical dimension, sufficient to receive a cable 14 of predetermined size, dimension, or gage therein in close proximity to the interior wall of the bore 62. Preferably, the tool 10 is provided along with a plurality of dies 28, each sized for use with one or more particular cable 14 sizes.

The die 28 is interchangeably and removeably installable in the leading end of the cutting cylinder 24. An exterior dimension of the die 28 is sized to fit within the central bore 30 at the leading end 32 of the cutting cylinder 24 in close proximity thereto. In one embodiment, the blade housing 26 extends beyond the leading end 32 of the cutting cylinder 24 and the die 28 is inserted into and retained within the bore 36 in the blade housing 26.

A retention pin 64 is provided in the blade housing 26 to extend through a wall of the blade housing 26, into the central bore 30 of the cutting cylinder 24, and into engagement with an exterior surface of the die 28. The retention pin 64 may be threadably coupled with the blade housing 26 to function similarly to a set-screw such that the pin 64 may be rotated into contact with the die 28 to retain the die 28 within the cutting cylinder 24. In one embodiment, the pin 64 comprises a set screw or comprises a thumb screw having a manually grip-able head. In another embodiment, the pin 64 is provided with a spring bias that biases the pin 64 against the die 28 and/or into a detent or similar feature on the exterior surface of the die 28 to retain the die 28 in position.

With continued reference to FIG. 6, the drive unit 22 comprises a housing 66, a gear train 68, a drive axle 70, and a driver-stabilizing plate 72. As depicted in FIGS. 1-9, the housing 66 may be formed from a plurality of plate members, including a front plate 74, a pair of spacer plates 76, a mid-plate 78, and a rear plate 80. However, one of skill in the art will recognize a variety of other forms and configurations the housing 66 may take without departing from the scope of embodiments described herein. For example, the housing 66 may comprise an injection molded part with appropriate standoffs, ribs, and other features configured to enable the functionalities described herein.

The front, mid, rear, and spacer plates 74, 78, 80, 76 are generally continuous plate members. The spacer plates 76 provide coaxially aligned apertures 82 sized to receive the cutting cylinder 24 therethrough and may provide mounting locations for the drive axle 70 and for a stub axle 98 interior to the housing 66. The drive axle 70 and/or the stub axle 98 may also be fully or partially supported by any of the front, mid, and rear plates 74, 78, 80. The front, mid, and rear plates 74, 78, 80 may be at least partially skeletonized to remove material from the bodies thereof while retaining an exterior wall around their perimeter which may aid to reduce weight of the tool 10 as well as material costs therefor. The spacer plates 76 have a thickness sufficient to space the front, mid, and rear plates 74, 78, 80 apart a distance to provide space for the gear train 68 and other components within the housing 66. In one embodiment, the front, mid, and rear plates 74, 78, 80 are constructed from a metal plate, such as aluminum or steel, while the spacer plates 76 are constructed from a plastic, resin, fiberglass, or similar lightweight material which may reduce the weight and/or material costs of the tool 10.

As depicted in FIG. 6, the gear train 68 includes three circular, circumferentially toothed gears: a drive gear 84, a transfer gear 86, and a cutting-cylinder gear 88. The gears 84, 86, 88 of the gear train 68 are aligned in a single plane with the mid-plate 78 and are captured between the spacer plates 76. Although a particular gear train configuration is shown and described herein, it is understood that a variety of other configurations may be employed to provide a desired mechanical advantage and to transfer rotational motion from the drive axle 70 to the cutting cylinder 24 without departing from the scope of embodiments described herein. For example, a plurality of other gears, a chain, or a belt might be employed.

The drive gear 84 is affixed to the drive axle 70 to be rotatable by the drive axle 70. The drive axle 70 is rotatably coupled to the front and rear plates 74, 80 via a bearing 89 carried by each of the plates 74, 80 and extends through an aperture 91 each of the spacer plates 76. The drive axle 70 is positioned at a location spaced transversely apart from the cutting cylinder and extends longitudinally and parallel to the cutting cylinder 24 toward and through an aperture 90 in the rear plate 80 as well as the bearing 89 carried thereby. A distal end of the drive axle 70 extends beyond the rear plate 80 and includes a plurality of facets 92 along its exterior surface that are engageable by teeth of a chuck 94 of a driver 96 or similar drive means.

The transfer gear 86 is positioned between and meshed with both the drive gear 84 and the cutting-cylinder gear 88 to transfer rotational motion therebetween. The transfer gear 86 is disposed on a stub axle 98 that extends longitudinally from the front plate 74 through the spacer plates 76 and to the rear plate 80. A distal end of the stub axle 98 may be received and supported within apertures 100 in the front and rear plates 74, 80 and/or the spacer plates 76. The stub axle 98 may be fixed to allow the transfer gear 86 to rotate thereon or the stub axle 98 may rotate with the transfer gear 86 relative to the housing 66.

The cutting-cylinder gear 88 is affixed to a gear flange 102 extending radially outward from an exterior surface of the cutting cylinder 24 by a plurality of fasteners 104 installed therebetween. In one embodiment, the cutting-cylinder gear 88 may be formed in an exterior surface of the cutting cylinder 24 and/or may be provided by the gear flange 102. The gear flange 102 and the cutting-cylinder gear 88 are thus captured between the spacer plates 76 and provide a union between the cutting cylinder 24 and the housing 66. The cutting cylinder 24 is thereby rotatable within the apertures 82 in the spacer plates 76 and relative to the housing 66 by rotation of the cutting-cylinder gear 88.

With reference to FIGS. 7-9 in particular, the driver-stabilizing plate 72 is coupled to the rear plate 88 of the housing 66 and extends transversely away from the cutting cylinder 24 a distance before turning to extend longitudinally rearward and generally parallel to a rotational axis of the cutting cylinder 24. A distal end portion of the plate 72 is thus spaced apart from the cutting cylinder 24 and includes a slot 106 that is sized and positioned to receive a handle portion 108 of the driver 96 while also enabling the driver 96 to be properly positioned to engage the drive axle 70. Engagement of the handle portion 108 of the driver 96 with the slot 106 resists rotational motion of the driver 96 relative to the tool 10 and about the drive axle 70 during operation of the tool 10.

The driver 96 preferably comprises a common, battery-powered, hand-held drill of which there are many examples in the art, however such is not intended to restrict the driver 96 to any particular drive means. For example, a variety of available products may be employed including corded and cordless electric drills, drill drivers, hammer drills, impact drivers, and ratchets as well as pneumatic and gas-powered devices and customized specialty devices. The driver 96 includes the chuck 94 or similar adaptor which is configured to engage the drive axle 70 such that the drive axle 70 can be rotated by the driver 96.

With continued reference to the FIGS. 7-9, operation of the jacket removal tool 10 is described in accordance with an exemplary embodiment. Initially, an appropriate die 28 is selected based on the size or gage of a particular cable 14 to be stripped, i.e. to have the jacket 12 removed therefrom. The die 28 is inserted into the leading end 32 of the cutting cylinder 24 and into abutment with the shoulder 33 therein. The retention pin 64 operated to engage and retain the die 28 in position by threadably rotating into contact with the exterior surface of the die 28 or with a detent or similar feature thereon or by actuating a spring bias on the pin 64.

The blade 52 is adjusted by rotating the fastener 54 to place the cutting edge 59 in a desired position relative to the central bore 30 of the cutting cylinder 24 to provide a desired depth of cut into the cable 14. Preferably, the blade 52 is positioned to place the base portion 63 of the cutting edge 59 between the jacket 12 and any underlying components of the cable 14.

The driver 96 is coupled to the drive axle 70 by inserting the drive axle 70 into the chuck 94 and inserting the handle portion 108 of the driver 96 into the slot 106 of the driver-stabilizing plate 72. The chuck 94 is adjusted to engage the drive axle 70 and resist relative rotational motion therebetween.

An end of the cable 14 is inserted through the leading end of the die 28 into the cutting cylinder 24 and brought into contact with the blade 52. The driver 96 is energized to rotate the drive axle 70 which in turn rotates the drive gear 84. Engagement of the handle portion 108 of the driver 96 with the slot 106 in the driver-stabilizing plate 72 substantially prevents the driver 96 from rotating relative to the drive axle 70 and the tool 10 when a rotational force is generated by the driver 96.

Rotational motion of the drive axle 70 is transferred to the cutting cylinder 24 via the gear train 68; the drive gear 84 rotates the transfer gear 86 about the stub axle 98 which then rotates the cutting-cylinder gear 88 and the cutting cylinder 24 coupled thereto. In one embodiment, the gear train 68 provides a gear ratio of about 6:1, i.e. six rotations of the drive axle 70 produces about one rotation of the cutting cylinder 24, however the gear train 68 can be otherwise configured without departing from the scope of embodiments described herein.

The blade 52 and the blade housing 26 are fixedly coupled to the cutting cylinder 24 and thus rotation of the cutting cylinder 24 also operates to move the blade 52 about the circumference of the cable 14. Such movement engages the cutting edge 59 of the blade 52 with the cable jacket 12 and cuts through the jacket 12 to the preset depth. The cut jacket 12 is directed away from the cable 14, along the blade 52 and/or the ejector surfaces 50 of the base wall 46 of the blade housing 26, and out of the opening 38 in the blade housing 26 (not shown).

The upstanding portion 61 of the cutting edge 59 of the blade 52 may draw the blade 52 and the tool 10 longitudinally along the cable 14 and/or the operator may provide a longitudinal force parallel to the length of the cable 14 to aid movement of the tool 10 along the cable 14. The interior portion 110 of the cable 14 with the jacket 12 removed continues through the central bore 30 and exits a terminal end 112 of the cutting cylinder 24.

The operator may continue stripping the jacket 12 from any desired length of the cable 14 up to and including the full length of the cable 14. Upon reaching a desired length of cable 14 with the jacket removed 12, the operator de-energizes the driver 96 and simply slides the tool 10 in the opposite longitudinal direction along and off of the cable 14. It may be necessary to clip or cut off a ribbon of the removed jacket 12 near the opening 38 of the blade housing 26 to ease removal of the tool 10 from the cable 14. The driver 96 might also be operated in an opposite rotational direction a short distance to disengage the blade 52 from the jacket 12 to further aid removal of the tool 10.

Orientation of the drive axle 70 and thus the driver 96 parallel to the longitudinal axes of the cutting cylinder 26 and the cable 14 eases operation of the tool 10 and reduces strain on the operator. The operator can simply apply any necessary force in the longitudinal direction in a natural way, i.e. in a way in which the driver 96 is designed to apply such force and in which the handle portion 108 thereof is configured to enable the operator to comfortably apply such force. For example, where the driver 96 comprises a drill, the drill is generally configured to enable a user to apply a force in a direction of the drilling action, i.e. parallel to a rotational axis of a drill bit disposed in the drill to aid the drilling operation. Similarly, a drill coupled with the tool 10 would thus be configured to enable an operator to apply a force generally parallel to the drive axle 70 which is coupled with the drill in the same manner as a drill bit would be in a standard application of the drill.

Further, engagement of the driver 96 with the driver-stabilizing plate 72 greatly reduces or eliminates any rotational torque or other forces that must be counteracted by the operator. And the mechanical advantage provided by the gear train 68 reduces the loads on the driver 96 and the operator during operation of the tool 10.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A jacket removal tool for removing a jacket from an electrical cable comprising:
   a cutting cylinder surrounding a longitudinally extending central bore extending therethrough and being rotatable about a longitudinal axis that is coaxial with the central bore;
   a blade housing affixed to the cutting cylinder at a leading end of the cutting cylinder, the blade housing having a housing bore extending coaxially with the central bore of the cutting cylinder, the housing bore having a housing bore diameter that is greater than a central bore diameter of the central bore;
   a blade mounted on the blade housing such that the blade housing and blade are rotatable with the cutting cylinder and the blade includes a cutting edge that extends in at least partially overlapping relationship with the central bore to provide a desired depth of cut for removing the jacket from an electrical cable inserted into the housing bore; a blade housing opening is formed in the blade housing, the blade housing opening is defined in part by a base wall with a blade channel formed in the base wall and opening into the blade housing opening, the blade is disposed in the blade channel and retained therein on a screw extending through the blade channel such that rotation of the screw adjusts the position of the blade within the blade channel, the base wall including an ejector surface angling radially outward from the blade housing opening to aid lifting of the jacket, removed from the electrical cable by the blade, radially outward and away from the electrical cable; and
   a drive axle aligned parallel to and spaced transversely apart from the longitudinal axis of the cutting cylinder and projecting rearward relative to the leading end of the cutting cylinder, the drive axle being operably coupled with the cutting cylinder to transfer rotational motion of the drive axle to rotational motion of the cutting cylinder, and the drive axle being engageable by a driver configured to rotate the drive axle.

2. The jacket removal tool as in claim 1 wherein a first end of the screw is accessible from an exterior of the blade housing and is configured as a manually grippable head to allow manual rotation of the screw or the first end of the screw is configured to be rotatable using a tool.

3. The jacket removal tool as in claim 1 wherein a spring is disposed on the screw between the blade and the blade housing to bias the blade outward from the blade channel.

4. The jacket removal tool as in claim 1 wherein the screw is threadingly coupled to the blade such that rotation of the screw adjusts the position of the blade within the blade channel.

5. The jacket removal tool as in claim 4 wherein a first end of the screw is accessible from an exterior of the blade housing and is configured as a manually grippable head to allow manual rotation of the screw or the first end of the screw is configured to be rotatable using a tool.

6. The jacket removal tool as in claim 1 further comprising:
   a die removably securable in the central bore, the die including a die bore extending therethrough and having an internal dimension that is equal to or just larger than an exterior dimension of an electrical cable that is to have a jacket thereon removed by the jacket removal tool and wherein a terminal end of the die is removably secured within a leading portion of the central bore.

7. A jacket removal tool for removing a jacket from an electrical cable comprising:
   a cutting cylinder surrounding a longitudinally extending central bore extending therethrough sized to receive an end of an electrical cable, the cutting cylinder being rotatable about a longitudinal axis that is coaxial with the central bore; a blade window is formed in a portion of a leading end of the cutting cylinder;
   a blade housing affixed to and surrounding the cutting cylinder at a leading end of the cutting cylinder and having a housing bore formed therein sized to receive the leading end of the cutting cylinder, a blade housing opening formed in the blade housing and aligned with the blade window when the blade housing is affixed to the leading end of the cutting cylinder;
   a blade mounted on the blade housing such that the blade housing and blade are rotatable with the cutting cylinder and the blade includes a cutting edge that extends at least partially through the blade housing opening of the blade housing and the blade window of the cutting cylinder and in overlapping relationship with the central bore to provide a desired depth of cut for removing the jacket from an electrical cable inserted into the central bore; and
   a drive axle aligned parallel to and spaced transversely apart from the longitudinal axis of the cutting cylinder and projecting rearward relative to the leading end of the cutting cylinder, the drive axle drivingly coupled to the cutting cylinder by a gear train including a cutting cylinder gear connected to the cutting cylinder and surrounding an outer surface of the cutting cylinder to transfer rotational motion of the drive axle to rotational motion of the cutting cylinder, and the drive axle being engageable by a driver configured to rotate the drive axle.

8. The jacket removal tool as in claim 7, the blade housing opening is defined in part by a base wall with a blade channel formed in the base wall of the blade housing and opening into the blade housing opening, the blade is disposed in the blade channel and retained therein on a screw extending through the blade channel, the screw having a first end accessible from an exterior of the blade housing when the blade housing is affixed to and surrounds the cutting cylinder such that rotation of the first end of the screw adjusts the position of the blade within the blade channel.

9. The jacket removal tool as in claim 8 wherein a first end of the screw is configured as a manually grippable head to allow manual rotation of the screw or the first end of the screw is configured to be rotatable using a tool.

10. The jacket removal tool as in claim 8 wherein a spring is disposed on the screw between the blade and the blade housing to bias the blade outward from the blade channel.

11. The jacket removal tool as in claim 8 wherein the screw is threadingly coupled to the blade such that rotation of the screw adjusts the position of the blade within the blade channel.

12. A jacket removal tool for removing a jacket from an electrical cable comprising:
   a cutting cylinder surrounding a longitudinally extending central bore extending therethrough sized to receive an end of an electrical cable, the cutting cylinder being rotatable about a longitudinal axis that is coaxial with the central bore; a blade window is formed in a portion of a leading end of the cutting cylinder;
   a blade housing affixed to and surrounding the cutting cylinder at a leading end of the cutting cylinder and having a housing bore formed therein sized to receive the leading end of the cutting cylinder, a blade housing opening formed in the blade housing and aligned with the blade window when the blade housing is affixed to the leading end of the cutting cylinder;
   a blade mounted on the blade housing such that the blade housing and blade are rotatable with the cutting cylinder and the blade includes a cutting edge that extends at least partially through the blade housing opening of the blade housing and the blade window of the cutting cylinder and in overlapping relationship with the central bore to provide a desired depth of cut for removing the jacket from an electrical cable inserted into the central bore;
   a drive axle aligned parallel to and spaced transversely apart from the longitudinal axis of the cutting cylinder and projecting rearward relative to the leading end of the cutting cylinder, the drive axle being operably coupled with the cutting cylinder to transfer rotational motion of the drive axle to rotational motion of the cutting cylinder, and the drive axle being engageable by a driver configured to rotate the drive axle; and
   a die removably securable in the central bore, the die including a die bore extending therethrough and having an internal dimension that is equal to or just larger than an exterior dimension of a cable that is to have a jacket thereon removed by the jacket removal tool and wherein a terminal end of the die is removably secured within a leading portion of the central bore.

13. The jacket removal tool as in claim 12, the blade housing opening is defined in part by a base wall with a blade channel formed in the base wall and opening into the blade housing opening, the blade is disposed in the blade channel and retained therein on a screw extending through the blade channel such that rotation of the screw adjusts the position of the blade within the blade channel.

14. The jacket removal tool as in claim 13 wherein a first end of the screw is accessible from an exterior of the blade housing and is configured as a manually grippable head to allow manual rotation of the screw or the first end of the screw is configured to be rotatable using a tool.

15. The jacket removal tool as in claim 13 wherein a spring is disposed on the screw between the blade and the blade housing to bias the blade outward from the blade channel.

16. The jacket removal tool as in claim 13 wherein the screw is threadingly coupled to the blade such that rotation of the screw adjusts the position of the blade within the blade channel.

17. The jacket removal tool as in claim 16 wherein a first end of the screw is accessible from an exterior of the blade housing and is configured as a manually grippable head to allow manual rotation of the screw or the first end of the screw is configured to be rotatable using a tool.

* * * * *